US011868711B2

(12) United States Patent
Procopio et al.

(10) Patent No.: US 11,868,711 B2
(45) Date of Patent: Jan. 9, 2024

(54) CREATING DYNAMIC DATA-BOUND CONTAINER HOSTED VIEWS AND EDITABLE FORMS

(71) Applicant: Google LLC, Mountain View, CA (US)

(72) Inventors: Michael Jeffrey Procopio, Boulder, CO (US); Sarmad Hashmi, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/445,162

(22) Filed: Aug. 16, 2021

(65) Prior Publication Data

US 2023/0047090 A1    Feb. 16, 2023

(51) Int. Cl.
*G06F 40/174* (2020.01)
*G06F 9/451* (2018.01)
*H04L 51/42* (2022.01)
*G06Q 10/107* (2023.01)
*G06F 21/31* (2013.01)

(52) U.S. Cl.
CPC .......... *G06F 40/174* (2020.01); *G06F 9/451* (2018.02); *G06F 21/31* (2013.01); *H04L 51/42* (2022.05); *G06Q 10/107* (2013.01)

(58) Field of Classification Search
CPC ........ G06F 40/174; G06F 9/451; G06F 21/31; G06F 8/34; G06F 9/453; G06F 8/36; G06F 9/45533; G06F 9/452; H04L 51/42; G06Q 10/107; G06Q 10/10
See application file for complete search history.

(56) References Cited

U.S. PATENT DOCUMENTS 10,482,150 B1 *   11/2019   Denzer ................ G06F 3/0484
2007/0180148 A1 *   8/2007   Yadidian .............. G06F 40/174
                                                        709/246

(Continued)

FOREIGN PATENT DOCUMENTS

EP         1672576 A2      6/2006

OTHER PUBLICATIONS

Suryadi K., "How to Embed Google Form", Feb. 11, 2019, WordPress Tutorial, Accessed using WayBack Machine on Jun. 13, 2022, https://web.archive.org/web/20190622052356/https://www.hostinger.com/tutorials/how-to-embed-google-form (Year: 2019).*

(Continued)

*Primary Examiner* — Rami R Okasha
(74) *Attorney, Agent, or Firm* — Honigman LLP; Brett A. Krueger

(57) ABSTRACT

A method for using a user-fillable form in a host container includes receiving, at a host container, a user-fillable form bound to dynamic data from an underlying data source where the user-fillable form has a data structure generated by prepopulated coding. The method further includes translating the user-fillable form into a hostable format for the host container. The method also includes rendering, using the hostable format for the host container, the user-fillable form in a user interface. The method further includes receiving, at the user interface of the host container, from a user of the host container, a data entry for input to the user-fillable form and updating, by the host container, the dynamic data from the underlying data source by persisting data from the data entry in a data store associated with the underlying data source.

28 Claims, 11 Drawing Sheets

(56) References Cited

U.S. PATENT DOCUMENTS

| | | | |
|---|---|---|---|
| 2010/0205269 A1* | 8/2010 | Poozhiyil | G06Q 10/107 |
| | | | 709/206 |
| 2016/0092176 A1 | 3/2016 | Straub et al. | |
| 2016/0188560 A1* | 6/2016 | Chen | G06F 40/174 |
| | | | 715/222 |
| 2016/0323224 A1* | 11/2016 | Stein | G06F 16/51 |
| 2016/0357724 A1* | 12/2016 | Stein | G06F 40/18 |
| 2017/0336933 A1* | 11/2017 | Hassel | G06F 3/167 |
| 2018/0067914 A1* | 3/2018 | Chen | G06Q 10/063116 |
| 2018/0069816 A1* | 3/2018 | Pham | G06F 40/174 |
| 2018/0107461 A1* | 4/2018 | Balasubramanian | G06F 8/38 |
| 2018/0121026 A1* | 5/2018 | Nadig | G06F 40/205 |
| 2018/0157467 A1* | 6/2018 | Stachura | G06F 8/30 |
| 2019/0147030 A1* | 5/2019 | Stein | G06F 40/174 |
| | | | 715/217 |
| 2019/0190859 A1* | 6/2019 | Sahney | H04L 51/04 |
| 2019/0196693 A1* | 6/2019 | Yang | H04L 51/226 |
| 2020/0110796 A1* | 4/2020 | Tsabba | G06F 8/38 |

OTHER PUBLICATIONS

International Search Report and Written Opinion for the related Application No. PCT/US2022/073909, dated Nov. 11, 2022, 111 pages.

\* cited by examiner

FIG. 2E

Approver View

Requestor: employeeX@company.com

Requested on: 7/14/2021 1:24:50 PM

Rejected Reasons:

☐ Too Expensive

☐ Replacement already pending

☐ Other: _____

Approval Notes:

Looks Good!

Decision:

[Approved] [Rejected]

Action:

[Submit] [Send Back]

CREATING DYNAMIC DATA-BOUND CONTAINER HOSTED VIEWS AND EDITABLE FORMS

TECHNICAL FIELD

This disclosure relates to creating dynamic data-bound container hosted views and editable forms.

BACKGROUND

Application designers or design teams generally invest many hours, days, or weeks perfecting the designs for front-end features for a particular application. The designers then hand the designs for the front-end features over to developers or computer software engineers, who again spend hours, days, or weeks writing computer code to recreate those design features. This designer/developer paradigm common to the application industry is extremely inefficient, requiring the developers to reinvent the wheel with respect to each new feature. Moreover, the computer code required to render each front-end feature or component (e.g., a login feature, a registration feature, a user profile feature, a content or news feed, a navigation bar, a media upload feature, a map and location feature, and other common features) is largely the same across different applications for the same or similar features. Nevertheless, the developers/computer software engineers are often required to develop these features from scratch each time in a process that may take several days or weeks.

SUMMARY

One aspect of the disclosure provides a computer-implemented method for using a user-fillable form in a host container. The computer-implemented method, when executed by data processing hardware, causes the data processing hardware to perform operations. The operations include receiving, at a host container, a user-fillable form bound to dynamic data from an underlying data source where the user-fillable form has a data structure generated by prepopulated coding. The operations further include translating the user-fillable form into a hostable format for the host container. The operations also include rendering, using the hostable format for the host container, the user-fillable form in a user interface. The operations further include receiving, at the user interface of the host container, from a user of the host container, a data entry for input to the user-fillable form and updating, by the host container, the dynamic data from the underlying data source by persisting data from the data entry in a data store associated with the underlying data source.

Another aspect of the disclosure provides a system for using a user-fillable form in a host container. The system includes data processing hardware and memory hardware in communication with the data processing hardware. The memory hardware stores instructions that when executed on data processing hardware cause the data processing hardware to perform operations. The operations include receiving, at a host container, a user-fillable form bound to dynamic data from an underlying data source where the user-fillable form has a data structure generated by prepopulated coding. The operations further include translating the user-fillable form into a hostable format for the host container. The operations also include rendering, using the hostable format for the host container, the user-fillable form in a user interface. The operations further include receiving, at the user interface of the host container, from a user of the host container, a data entry for input to the user-fillable form and updating, by the host container, the dynamic data from the underlying data source by persisting data from the data entry in a data store associated with the underlying data source.

Implementations of either aspect of the disclosure may include one or more of the following optional features. In some implementations, the operations further include requesting, by the host container, an application associated with the data source to generate the user-fillable form wherein receiving the user-fillable form comprises receiving the user-fillable form generated by the application associated with the data source. In some examples, rendering the user-fillable form in the user interface includes rendering the user-fillable form in the user interface in response to an indication of a user action performed in the host container where the user action indicates that the user intends to communicate with the underlying data source. In some configurations, the operations also include querying the underlying data source for the dynamic data, receiving query results comprising current data corresponding to the dynamic data from the underlying data source, and populating the current data in the user-fillable form, wherein the user-fillable form rendered in the user interface comprises the current data. In some examples, the operations further include determining whether the data entry received from the user for input to the user-fillable form comprises a valid data entry wherein updating the dynamic data from the underlying data source by persisting the data from the data entry in the data store associated with the underlying data source occurs when the data entry received from the user for input to the user-fillable form comprises the valid data entry. In these examples, when the data entry received from the user for input to the user-fillable form comprises an invalid data entry, the operations may generate an indication that the data entry is invalid and receive a valid form of the data entry. Here, updating the dynamic data from the underlying data source includes using the valid form of the data entry to update the dynamic data from the underlying data source. In some implementations, the operations also include determining that the user is an authenticated user permitted to access a portion of the dynamic data associated with the data entry. The user-fillable form may include a read-only field and an editable field capable of receiving user-generated data. The underlying data source may be hosted by an application residing outside of the host container. Updating the dynamic data from the underlying data source may occur as the user interface receives the data entry for input to the user-fillable form from user.

In some examples of either aspect of the disclosure, the host container executes an electronic mail (email) communication application. In these examples, the user interface may render the user-fillable form comprises a body of an email message. In some implementations, updating the dynamic data from the underlying data source occurs responsive to the user sending the email message to an email recipient where the email message includes the data entry input to the user-fillable form rendered in the body of the email message.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2E are schematic views of examples of a form manager.

FIGS. 3A and 3B are schematic views of example forms generated by a form manager.

Like reference symbols in the various drawings indicate like elements.

DETAILED DESCRIPTION

Figure 1A:
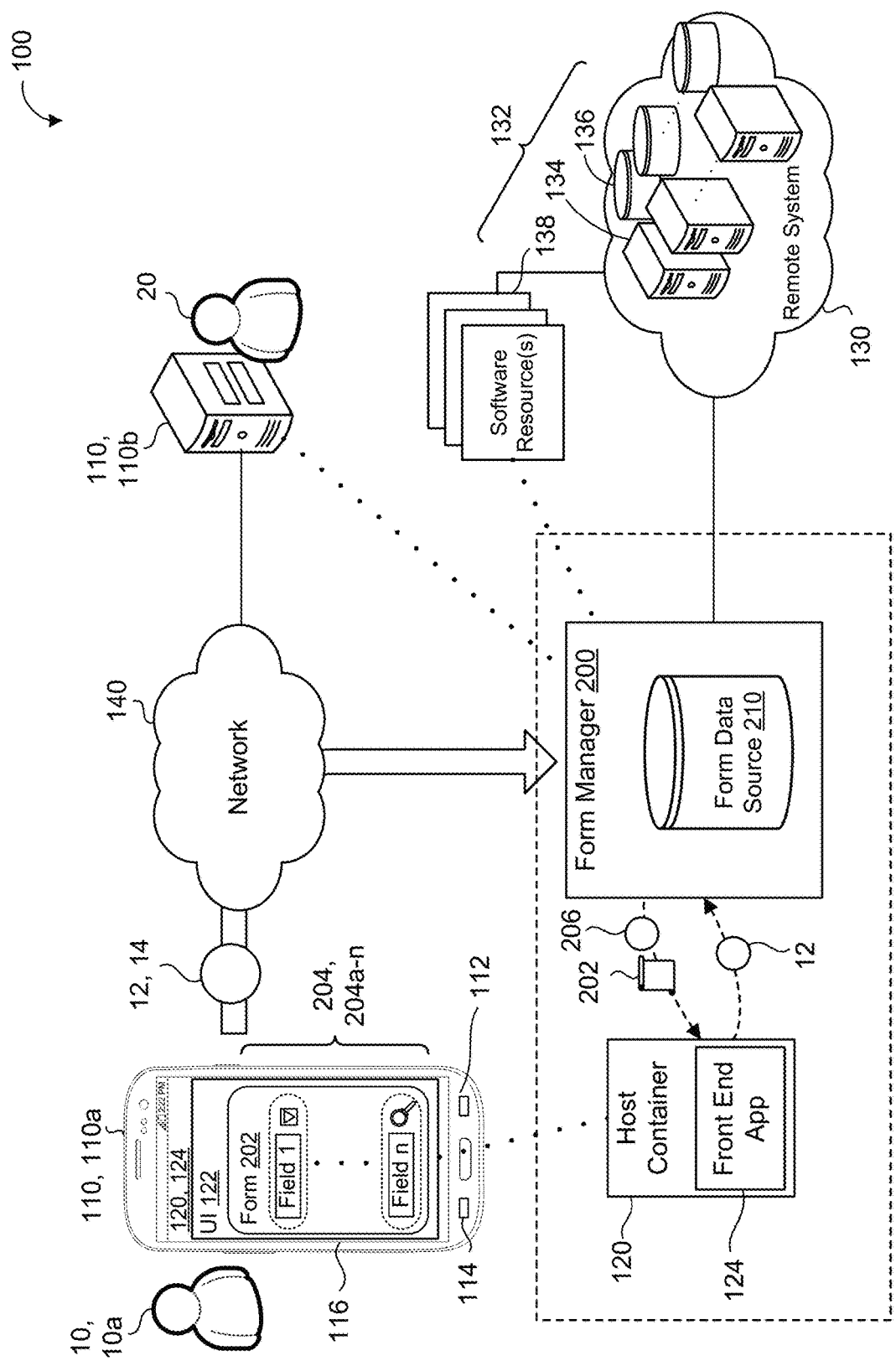
FIG. 1A is a schematic view of an example computing environment that includes a form manager.

Today the workload of many people revolves around various computing applications. That is, in the digital age, the jobs and lifestyles of people tend to center around a computer. For instance, many people's jobs rely on email communication, word processing applications, spreadsheet applications, file generation and modification applications, database or data collection applications among others.

With a plethora of different applications, people have become accustomed to using multiple applications simultaneously or using multiple pages of a single application as part of their everyday workspace (e.g., multiple tabs in a web-browser). Whether a user realizes it or not, the user is often transferring the data from one application or page to be fed or input into another application. For instance, the user is generating a slide deck for a presentation by obtaining data from a spreadsheet to build a chart or convey particular information. This type of multitasking is typically referred to as context switching (or task switching). In other words, the user switches his or her attention between two or more tasks (e.g., two or more content delivery objects). Unfortunately, from a human perspective, switching one's attention between multiple tasks is, not only taxing on the human brain, but also inefficient and may diminish potential productivity capabilities. Here, each change in attention inherently causes changeover time that can accumulate to a significant time loss. For example, the simple task of copying data from one application (e.g. a pdf form reader) to another application (e.g., a spreadsheet or database) can become quite burdensome and time consuming. Furthermore, the human mental facilities have to resituate themselves each time the task shifts. This can demand a high level of continued focus to multi-task effectively over longer periods of time; increasing the likelihood of mental fatigue. When one or more of these factors compound, context switching may cause unwanted outcomes such as errors or lower overall productivity.

As an example, in the situation where an employee wants to request time off for a vacation, the employee' company may have a template form that requests particular information from the employee about the request for time off. To illustrate, the form may include fields that prompt information such as dates of the time off, the department of the employee, the manager of the employee, the manager's email, the employee's email, whether the employee is using vacation time or sick time, etc. Here, the employee's company may have a policy to complete and submit the time off request form to the employee's manager. In this example, the completed form has to be emailed to the employee's manager as an attachment. After completing the form, the employee emails his or her manager with a summary of the request in the body of the email along with the completed form as an attachment. In this situation, the employee may use multiple applications to complete this seemingly simple request. The employee will have to use an email application to generate the email, a document retrieval application to retrieve the form, and a form-filling application to complete the form (or some means to print a hardcopy and then re-digitize the completed hardcopy). This means that the employee's workflow may be to create an email to his or her manager, then complete the form using the document retrieval and form-filling applications, and then return to the email to attach the completed form and summarize the request in the body of the message to the manager. This process inherently burdens the employee with several instances of task switching (e.g., from filling the form to generating the email). Moreover, if the employee is not careful, the completed form and the summary in the email may have discrepancies that may introduce further burdens (e.g., additional follow-up) on the process.

Situations like the time off request are often commonplace in work environments even though these processes are generally not substantive processes related to an employee's job function. That is, employees are often required to perform ancillary processes (e.g., administrative processes) such as time off requests, reimbursement requests, travel requests, meeting requests, approval requests, signatory requests, quality control documentation, process deviation requests, overtime requests, etc., in addition to their primary job functions. Here, it would be advantageous if these ancillary processes were more efficient and did not routinely suffer from context switching to enable employees to focus their time on other job functions (e.g., primary job functions).

Context switching also tends to manifest today due to the data driven nature of many workflows. With increased computing power and accessibility, vast amounts of data is collected and available for various analytics. Yet to perform analysis on such collected data often requires the data to be transferred or translated into one or more forms. Returning to the time off request example, the employee's manager receives the completed time off request form and may be required to input the information into some log of employee time off (e.g., for payroll and accounting purposes). Here, this means that the manager opens the completed form in a document reader application and transfers the information gathered in the completed form into an employee database (e.g., a spreadsheet containing employee information). Additionally, the manager may need to cross-reference the employee database to determine whether the employee is eligible for the time off requested or, alternatively, if the employee's request is feasible with employee scheduling. For instance, the employee may be one of two people capable of performing a certain manufacturing process. Here, the other employee capable of performing the manufacturing process may have already been approved for time off during the requested dates. In this situation where there is a scheduling conflict, the manager may then deny the employee's request or inform the employee of the conflict. Much like the tasks to generate the time off request by the employee, the managerial side of the time off request/approval process may also require context switching to enter the data into the employee database and to respond to the employee request (e.g., via a reply email).

To address some of the issues with context switching, certain applications have evolved to function as a centralized workspace or hub. In other words, these centralized applications may integrate with one or more other applications in some manner. Some centralized applications may promote efficiency by linking or shepharding a user to another application with minimal additional user input. For example, an email communication application opens a calendar or scheduling application when generating a meeting request. In another example, a file management application renders a static view or preview of a file for the user. Although this integration may promote some efficiencies by guiding the user directly to a particular destination, this approach still inevitably encounters context switching because the user is diverted from their current location. Stated differently, the user does not remain in-page at the primary application. Instead, the primary application is configured to transfer the user to another window or page. In the case of scheduling a meeting request in an email application, the email application opens a window to a schedule of the invited guests and then the user returns to the email to complete and send the meeting request. Similarly, when an email includes an attached document, the document is not embedded live into the body of the email such that the document is capable of being edited in the email body itself. Rather, the email application provides access to the document by way of a viewer application coordinating with the email application.

To overcome some of these issues, the approach described herein functions to generate forms that can be rendered in-page at the primary application. Furthermore, these forms may include editable portions in-page that gather data from the user. These forms may also be configured such that when the user submits the form with inputted data (e.g., in-page) or merely inputs data into the form, the data is updated in the underlying data source (e.g., a data storage associated with the underlying data source). This means that, in the case of time off request/approval, the employee may open an email template that loads the time off request in the body of the email. The employee may then proceed to fill-in the information in the necessary field in the body of the email to complete the time off form. After the employee's time off request data is input into the form rendered in the body of the email, the form may function in a few ways. In one manner, the form is configured such that, when the employee enters data into the form, the data is automatically updated in the underlying database or data store that includes employee time off request information. In other manner, the form is configured such that, when the employee sends the email including the completed form to his or her manager, the action of sending the email triggers the data entered into the form to be updated (e.g., persisted) in the underlying database or data store that includes employee time off request information. In yet another manner, the form is configured with a submit button separate from the send function that, when the employee selects the submit button, the submit action triggers the data entered into the form to be updated (e.g., persisted) in the underlying database or data store that includes employee time off request information.

Additionally or alternatively, the in-page form rendered in the application may include live or current data from the underlying source. That is, in the previously mentioned case of the scheduling conflict, the manager may not have entered the other employees approved time off into the employee database yet. In a conventional situation where the employee may be able to see some portion of the employee database to identify scheduling conflicts at the time of request, the manager's inability to enter the other employees request would result in the employee generating the request for the conflicted dates unbeknownst to the employee. In contrast, if the employee database automatically updated when the other employee submitted the request, the employee may be able to see the live version of the employee database for scheduling and avoid consuming time generating a request that is likely to be denied.

Unfortunately, rendering an editable form in an application is not without its difficulties. That is, generating a form that is compatible with a particular portion of an application (e.g., in-page) can often become a time-consuming coding process. In other words, a sophisticated coder or programming would need to author the form in a manner that is compatible with target application (or portion thereof). Yet this may become cost or time prohibitive, especially for ancillary processes. In other words, to generate a custom-programmed form that performs an ancillary process may not align with other business interests where, for example, time and resources could be invested to improve primary processes.

To avoid custom programming, the form described herein is a result of a no-code form generator. A no-code form generator refers to an engine or form-authoring application that includes templatized or pre-populated coding for form elements, form dependencies, and/or form automation. With templatized or pre-populated coding for these or other form components, an entity without coding sophistication may use the no-code form generator to build a custom form for a particular target application. That is, the entity using the no-code generator will not need to specify or input code to build the form. This enables users with a wide range of code skills (e.g., ranging from little to no coding skill to more sophisticated coders) to generate user-fillable forms that operate in-page or embedded in some particular portion of a target application. Furthermore, the form may exist or be configured to be embedded in an application hosted (e.g., executing) in a host container that does not include the underlying data source of the form. In this respect, the underlying data source of the form may be hosted or associated with another application residing outside of the host container where the form is to be rendered for the user to utilize.

Figure 1B:
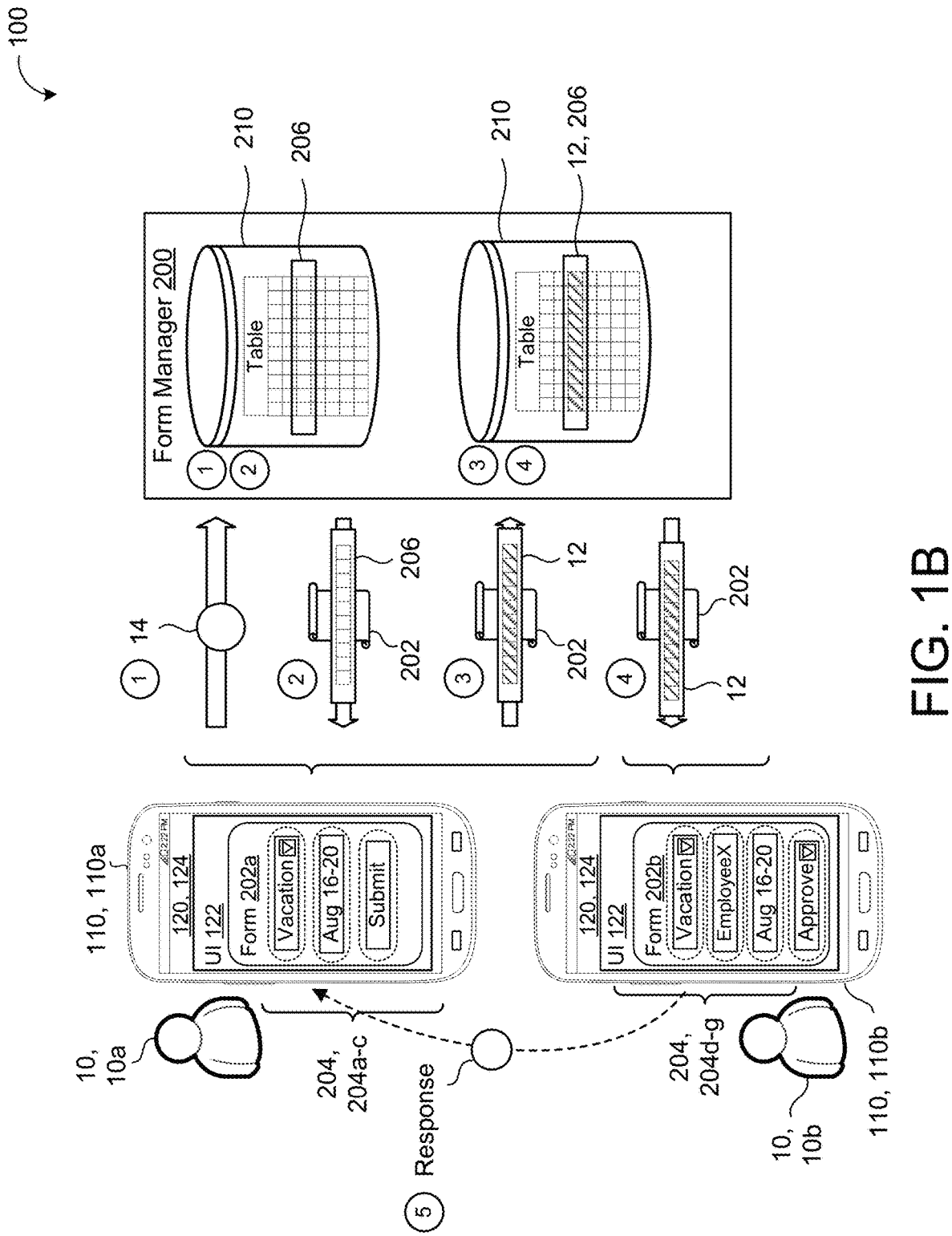
FIG. 1B is a schematic view of an example computing environment that includes a form manager coordinating multi-party form use.

Referring to FIGS. 1A and 1B, the computing environment 100 includes a user 10 operating a user device 110 (also referred to as the device 110) to communicate with a form manager 200. The form manager 200 is configured to generate a form 202 (also referred to as a user-fillable form 202) that is capable of being hosted in a format that a host container 120 can render as a user interface 122 for the user 10. A host container 120 generally refers to an abstraction at the application layer that is able to virtualize an operating system to run an application (e.g., the application 124) as an independent and self-contained application environment. In this sense, a host container 120 functions as a stand-alone unit with all of the necessary components to operate the application 124 contained therein (e.g., application binaries, application dependencies, hardware requirements, etc.).

As shown in FIG. 1A, as application 124 executes, the application 124 may generate a user interface 122 that presents the user 10 with the form 202 from the form manager 200. Here, the application 124 is considered a front-end application because it is a user-facing application that allows the user 10 to enter user data 12 into the form 202. For instance, the form 202 includes form elements 204, 204a—n such as form fields 1-n that the user 10 may read data from (e.g., read-only elements) or write data into (e.g., write user data 12 to editable elements). Once the form 202 receives the user data 12 (e.g., as form data entry), the form manager 200 communicates the user data 12 to an underlying data source 210 or a form data source 210. The form data source 210 is configured to store the user data 12 along with other form data 206 relating to the form 202. Here, the form data source 210 is shown as a data store integrated with the form manager 200 Yet in other configurations, the form data source 210 is simply associated with or accessible to the form manager 200 (e.g., another database or database management application that is in communication with the form manager 200).

The device 110 may correspond to any computing device associated with the user 10 and/or author 20. When the device 110 is associated with the user 10, the device is capable of executing the host container 120 and/or application 124. For instance, FIG. 1A depicts a first user device 110, 110a associated with the user 10 executing the application 124. When the device 110 is associated with the author 20, the device 110 is capable of providing the processing resources to coordinate form generation (e.g., the form manager 200). For example, FIG. 1A illustrates a second user device 110, 110b associated with the author 20 using the form manager 200 to generate the form 202 for the application 124. In some examples, user devices 110 include, but are not limited to, mobile devices (e.g., mobile phones, tablets, laptops, e-book readers, etc.), computers, wearable devices (e.g., smart watches), smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to form entry and/or form generation.

The device 110 may also include a display 116 to display graphical user interface (GUI) elements (e.g., a form elements 204) and/or graphical content. Some examples of GUI elements include windows, screens, icons, menus, fields, text, etc. In this sense, the display 116 is configured to display the user interface 122 including any form elements 204 associated with the form 202 for the user 10. These form elements 204 may be elements that the user 10 may interact with (e.g., selectable GUI elements or editable GUI elements) in order to enter the user data 12 into the form 202.

The author 20 is an entity that uses the form manager 200 to generate the form 202 presented as a user interface 122 in the front-end application 124. Since the form manager 200 includes a no code form generator (e.g., the form builder 220), the author 20 of the form 202 does not need to be a sophisticated programmer or coder to design and implement the form 202 for the host container 120. Rather, the author 20 may be an administrative entity, information technology personnel, or some other entity in charge of the process being performed at the application 124 that the form 202 is integrated with (e.g., an approval manager for the time off request/approval process). The author 20 may be the same entity as the user 10 or a different entity. For instance, the author 20 refers to the user of the form 202, but at the form generation stage rather than the form entry stage. In other words, the user 10 designs the form 202 as an author 20 to then later use as the user 10 during implementation of the form 202.

As shown in FIG. 1A, the host container 120 and/or the form manager 200 may be software hosted by a remote system 130 (e.g., a distributed computing system such as a cloud environment) in communication with the user device 110 via a network 140. For example, either the application 124 or the form manager 200 may be provided to the user 10 and the author 20 (respectively) as software as a service (SaaS) from a software service provider (e.g., the owns/managers the remote system 130). The remote system 130 may include scalable remote resources 132, such as remote data processing hardware 134 (e.g., remote servers or CPUs), remote memory hardware 136 (e.g., remote databases or other storage hardware), and/or remote software 138 (e.g., software applications hosted by the remote system 130). The device 110 may utilize the remote resources 132 to perform various functionality related to form entry and/or form generation.

In some implementations, one or more components of the form manager 200 may reside on the device 110 (referred to as on-device components) or reside remotely (e.g., reside on the remote system 130), but in communication with the device 110. In other words, any of these components of the form manager 200 (e.g., the data store 210, a form builder 220, a form translator 230, and an updater 240) may be local or remote in any combination. For instance, the form translator 230 may reside on the device 110 to translate the form 202 to a format that the host container 120 (e.g., the application 124) can render while the other components (e.g., the data store 210, the form builder 220, and the updater 240) reside remotely. In some configurations, when a component of the form manager 200 is rather large in size or processing requirements, the component may reside in the remote system 130. Yet when the device 110 may support the size or the processing requirements of one or more components of the form manager 200, the one or more components of the form manager 200 may reside on the device 110 using the data processing hardware 112 and/or the memory hardware 114. For instance, the form manager 200 may be an application that the user 10 downloads and stores in the memory hardware 114 of the user device 110. Optionally, the one or more components of the form manager 200 may reside both locally/on-device and remotely. For instance, one or more components of the form manager 200 may default to execute on the remote system 130 when a connection to the network 140 between the device 110 and remote system 130 is available, but when the connection is lost or the network 140 is unavailable, the components of the form manager 200 instead execute locally on the device 110.

The form 202 authored by the author 20 and generated by the form manager 200 generally refers to a user-fillable form. That is, the form 202 includes one or more fields or form elements 204 that the user 10 may write user data 12 to (e.g., an editable field) or read data from (e.g., a read-only field). The author 20 may generate the form 202 such that the form 202 is capable of supporting form elements 204 from traditional form fields, such as text areas, dropdown lists, and/or user action buttons, or even non-traditional form fields. The form 202 may also include varying degrees of logic such that a data entry by the user 10 or a user action within the form 202 can trigger different events to occur (i.e., perform some preconfigured automation). For example, in the case of the time off request, the form 202 is configured to automatically send the completed form 202 to the manager of the employee when the user 10 completes a particular set of fields or the user 10 selects "submit." For instance, the author 20 configures the form 202 to lookup the manager that corresponds to the requesting employee and to populate the manager's email as the destination for the completed form 202 or some portion thereof. This means that user input and/or user actions in the form 202 can be posted or communicated to listener endpoints; thus allowing these inputs/actions to tie into other functionality, such as persisting the entered user data 12 into the underlying data source 210 or communicating the entered user data 12 to a particular destination (e.g., the manager's email address).

Generally speaking, the author 20 designs the form 202 to be associated or bound to a particular set of data referred to as form data 206. Here, the author 20 may design the form data 206 to be any type of schema or view definition. When the form 202 is then rendered as the user interface 122 at the application 124, the form 202 is configured to render the form data 206 that the author 20 has bound to the form 202. For instance, when the user 10 initiates the form 202 at the application 124, the form 202 queries (e.g., via the form manager 200) the underlying data source 210 for the form data 206 and generates the form 202 for the user 10 with the form data 206 resulting from the query. To illustrate, FIG. 1A depicts the application 124 and/or user device 110 generating a form generation request 14 that queries the form manager 200 for the form data 206. In some examples, the author 20 configures the form data 206 to be data from a table or data set with a defined schema/definition type. In other words, the author 20 binds the form data 206 to a particular data model (e.g., a custom data model or a preconfigured data model). For instance, in the time off approval process, the form 202 for the employee (i.e., the user 10) may be bound to data from a table in an employee database. Here, although the table may be modeled to include many different columns of data that are pertinent to employees, the author 20 may design the form 202 to be bound to particular columns of data such that data entered into the form 202 enters data (e.g., as a new record or data entry) into particular columns of the table. That is, depending on the underlying data source 210 and design of the form 202, the form data 206 may correspond to a subset of columns in a row of a particular reference table.

Although the form 202 may be bound to the form data 206, the fact that the form 202 is bound to the form data 206 does not make the form data 206 static in nature. Rather, the form data 206 may dynamically change (e.g., within a particular set of constraints). For example, the form data 206 may be bound to the columns of the employee database that include "employee name," "employee email," "employee manager," "manager email," "requested dates," and a column that indicates whether the request is for paid time off or sick time. In this example, some of these fields of the form data 206 may be prepopulated with data when the form 202 is rendered (e.g., readable fields) while others may be blank to allow the user 10 to enter user data 12 into the field (i.e., writable fields). That is, "employee manager" and "manager email" may be populated in the form 202, but the field corresponding to the "requested dates" is not populated (i.e., a blank field with a prompt to enter the requested time off dates). In this example, if the organization undergoes a restructuring, the employee's manager may change in the underlying data source 210, but the form 202 will nonetheless populate the new approval manager (e.g., without necessarily requiring any further user input). In this respect, the form 202 can be tied to form data 206 that is fluid and changing such that the form 202 represents live (i.e., current) form data 206.

Moreover, the form 202 may pull form data 206 from the underlying data source 210 (e.g., a table associated with the source 210) to facilitate data constraints on the user data 12 that may be input into the form 202. In other words, if the author 20 authors the form 202 to include five columns from a table where one of the columns is constrained to a price or number data type, the form 202 will reflect this data type constraint at the user interface 122. For instance, if the user 10 attempted to enter user data 12 that does not satisfy the constraint, the form 202 may not accept the user data 12 or not allow the user data 12 to submit the form 202 without satisfying the constraint. For example, the form 202 is configured to communicate an indication of whether a user data entry is a valid data entry (i.e., satisfies any constraints) or is an invalid data entry. Additionally, when the data entry by the user 10 is an invalid data entry, the form 202 may be configured by the author 20 to provide some indication as to why the data entry is invalid (e.g., "Invalid data type—Please enter a number"). In this respect, the form 202 may be configured by the author 20 with validation capabilities that ensure that user data 12 satisfies desired constraints. By satisfying such constraints, user data 12 may then be entered into the underlying data source 210 (e.g., the table) without disrupting or disturbing the organization of the data source 210.

Referring further to FIG. 1A, while using the application 124 from the host container 120, the user device 110 (e.g., via the user 10) may perform some action that invokes the use of the form 202. For instance, the application 124 is an email communication application and the user 10 creates a new email that populates the form 202 as a template embedded in the body of the email. Here, for the email communication application, the form manager 200 may setup the form 202 to be rendered in a particular format compatible with the body of an email, such as an accelerated mobile page (AMP). An AMP refers to a particular language format similar to a page of HyperText Markup Language (HTML), but different in that AMP is configured with a limited set of allowable functionality (e.g., allowing it to be integrated with email) that promotes mobile deployment. When the action occurs (e.g., when the user 10 creates an email that will populate the form 202), the form 202 may be configured upon initiation to request the form data 206 corresponding to the form 202. For instance, FIG. 1A depicts the user device 110 and/or application 124 communicating a form generation request 14 to the form manager 200. In response to the request 14, the form manager 200 may return the form 202 along with the form data 206 to the source of the request 14. With the form 202 and its corresponding form data 206, the user 10 is able to enter user data 12 into the form 202 (e.g., enter user data 12 into one or more field elements 204). In the case of the form 202 being embedded in the body of an email, sending the email that includes the form 202 may function as the trigger that communicates the user data 12 in the form 202 back to the form manager 200. With the user data 12, the form manager 200 may update the form data 206 in the underlying data source 210 by persisting the user data 12 to the form data source 210 (e.g., storing the user data 12 in a data store associated with the data FIG. 1B is similar to FIG. 1A, but illustrates one or more forms 202 being used in a multi-party scenario. A multi-party form scenario may be a situation where a first process (e.g., filling-in a first form 202, 202a) can trigger one or more secondary processes). Returning to the time off request/approval example to describe FIG. 1B, the first process refers to the employee as the first user 10, 10a filling out the time off request form 202, 202a. This first process then triggers a secondary process of time off approval by the employee's manager shown as the second user 10, 10b. Here, at the first step 1, the user device 110 generates the request 14 for the form 202 and/or the form data 206 corresponding to the form 202. At step 2, the form manager 200 returns the form 202 along with the form data 206 and coordinates with the application 124 to renders the form 202 as the user interface 122 at the application 124. In some examples, when the form manager 200 renders the form 202, the form manager 200 is configured to generate a new record in the form data source 210 for the new or requested instance of the form 202 (i.e., the form manager 200 inserts a new row in a table that corresponds to the form data 206). In other words, the form manager 200 renders the form 202 with form data 206 that includes one or more empty entries (i.e., blanks) to enable the user 10 to submit user data 12 into these empty entries. In the example of FIG. 1B, the form 202 includes three field elements 204, 204a-c. The first element 204a is a dropdown list that characterizes the type of request being made by the request form 202a (e.g., the user 10 may select a "vacation" request type). The second element 204b is a field where the user 10 enters user data 12 corresponding to the requested vacation data (e.g., shown as "August 16-20"). The third element 204c is an action element that triggers the submission of the request form 202a. Here, the user 10 completes the request form 202a and selects the submit button (i.e., the third element 204b). By selecting the submit button, the submit button serves as a trigger for the secondary process of time off approval. That is, the submit button may be configured to generate a subsequent approval form 202 (e.g., shown as the second form 202, 202b) following submission of the request form 202a (e.g., shown as the first form 202, 202a). Moreover, at step 3, the submission of the request form 202a by the first user 10a sends the user data 12 entered into the request form 202a to the form manager 200 so that the form manager 202 may persist the user data 12 into the data form source 210 (e.g., shown as a table). Step 4 may occur simultaneously with step 3 or subsequent to step 3. At step 4, the manager 10b receives the approval form 202b that includes four form elements 204d—f where three of the four form elements 204d—g are populated with user data 12 from the employee 10a. In this situation, the form 202 has a fourth element 204g that is blank such that that the manager 10b may select from a dropdown list of whether, for example, the manager 10b approves or denies (or some alternative response) the time off request from the employee 10a. In this example of an approval form 202b, the other elements 204d—e identify that the type of request (e.g., shown as a vacation request), the employee submitting the request (e.g., employee X), and the requested vacation dates (e.g., shown as "August 16-20"). Although not shown, the manager 10b, similar to step 3, may communicate the user data 12 entered by the manager 10b (e.g., approve or deny) back to the form manager 200 when the manager 10b completes the fourth element 204g. In this respect, any additional data generated by the manager, such as the manager's approval decision, is stored in the form data source 210.

Referring to FIGS. 2A-2E, the form manager 200 includes the form data source 210, an application editor 225, and a runtime server 235. The application editor 225 implements a form builder 220, and the runtime server 235 implements a form translator 230 and an updater 240. In some implementations, the form manager 200 functions as a backend application that faces the author 20 and the host container 120 or application 124 rather than being in direct communication with the user 10. The form builder 220 functions as the no code form generator. That is, the author 20 utilizes the form builder 220 to build the form 202 that will be rendered for the user 10 as the user interface 122 (e.g., for the application 124 of the host container 120). In this sense, the form builder 220 dictates the user experience (i.e., how the form 202 looks and feels). With the form builder 220, the author 20 may designate the form data 206 from the form data source 210. For instance, the author 20 designates that the form data 206 corresponds to some portion of one or more tables of data stored at the form data source 210. In addition to simply designating the form data 206, the author 20 uses the form builder 220 to generate the data structure 222 of the form 202 according to form elements 206 that are templatized or precoded. In other words, the form builder 220 may tie form data 206 to form widgets, such as dropdowns, lists, buttons, icons, fields, text, prompts, titles, headings, or different types of graphical content (e.g., charts, diagrams, graphics, or other media content). With precoded or templatized elements 204, the author 20 does not need to input or specify any particular coding for the form 202, but rather can focus on aspects of the form 202 such as the form's aesthetics or logic. In this sense, the author 20 does not need to be a developer who often needs to know coding as well as design, but can instead address the design of the form 202 and how it will function in a particular workflow. This allows the author 20 to concentrate on how the form 202 will seamlessly integrate with the application 124 in order to prevent undesirable user actions, such as context switching. The author 20 may also designate a message or text, such as a body of an email functioning as a preamble or footnote, to accompany the form 202 when generated. Thus, other user-specified content may accompany the form data 206 in the generated structure 222 of the form 202.

The application editor 225 implements the functionality of the form builder 220. Responsive to an author 20 selecting form widgets and other aspects of the form, such as form elements 204 for data entry or data display and email recipients for a given form 202, the application editor 225 links the underlying form data 206 to the chosen form elements 204 and generates the data structure 222. When appropriate, the application editor 225 may also provide the activation for subsequent processes triggered by an action or data entry on a created form 202. For instance, in the time off request example, the application editor 225 may link data provided in a request form with defined columns of form data 206 and link the submission of the request form 202a with the generation of an approval form 202b. Such links may be defined by the author 20 of the forms via precoded form elements 204 in the form builder 220 and enabled by the application editor 225. Thus, the structure 222 includes the author selected precoded elements 204 as provided by the form builder 220 and the underlying links between the elements 204 and the data source 210 as provided by the application editor 225.

The form builder 220 then communicates the structure 222 of the form 202 to the form translator 230. Form translator 230 translates the form 202 into a hostable format 232 for the host container 120. For instance, in the case of an email application, the form translator 230 translates the form 202 into an AMP format 232 that can be rendered in an email itself (e.g., the body of the email). When form translator 230 translates the form into the hostable format 232, the form translator 230 is then configured to render the form 202 in a user interface 122 using the hostable format 232. In some examples, the form translator 230 renders the form 202 in the user interface 122 when the user 10 or the user device 110 requests that the form 202 be loaded as the user interface 122 in the host container 120. For example, the user 10 performs some action that triggers the form translator 230 to render the form 202 in the hostable format 232 at the application 124. Optionally, the host container 120 may detect, when it receives a communication from the form translator 230, that it has received a form 202 in a hostable format 232 suitable for an application 124 of the host container 120 and render the form 202 accordingly. In this sense, the form translator 230 may operate in conjunction with the application 124 and/or host container 120 to understand how the form 202 should be translated to the hostable format 232 in order to be properly rendered as a user interface 122 in the host container 120.

The author 20, via use of the form builder 220, may define how the form 202 will render as the user interface 122. In other words, the author 20 may make choices in creating the form 202 using the form builder 220 that will determine a view of the form 202 and how the form will act and behave at the user interface 122. Similar to other choices made by the author 20, defining the view and behavior of a given form 202 may be provided as precoded form elements 204 enabled by the application editor 225 and defined within the structure 222.

Thus, the form translator 230 receives the structure 222 of the form 202 from the form builder 220 and renders the form 202 as the user interface 122 via the application 124 of the host container 120. As discussed above, the application 124 of the host container 120 may require a hostable format 232 (e.g., an AMP format) to properly display the form 202 as a user interface 122. The form translator 230 maps or links the form data 206 to the appropriate fields at the user interface 122 so that the structure 222 that the author 20 has defined may translate to the hostable format 232. For instance, in the example of a form embedded in the body of an email, the form translator 230 may translate the structure 222 to link defined columns of form data 206 with particular fields of the form embedded in the email so that user inputs received in the fields or information displayed to the user in the fields may correspond to the defined form data 206. Thus, the form translator 230 automatically translates the structure 222 to the appropriate hostable format 232 and maps the form data 206 to fields at the user interface 122 prior to the host container 120 receiving the form 202.

The form translator 230 may also be configured to render the form 202 in the user interface 122 with the most current form data 206. To render live or current form data 206, 206C, the form translator 230 may communicate a query 234 to the form data source 210 for the current form data 206, 206C when rendering the form 202. In response to the query 234, the form translator 230 receives query results corresponding to the current form data 206C stored at the form data source 210. With the current form data 206C, the form translator 230 renders the form 202 such that the form 202 is populated with the most current form data 206C.

With the form 202 rendered as the user interface 122, the user 10 may then proceed to use the device 110 to enter user data 12 into the form 202. When the user 10 inputs user data 12 as a data entry into the form 202, the updater 240 is configured to obtain the user data 12 entered into the form 202 and to update the form data 206 from the form data source 210. For instance, the updater 240 updates the form data source 210 with the user data 12 by persisting the user data 12 from the data entry into the form 202 in a data store associated with the form data source 210. The updater 240 may perform its updating functionality on command or listen for some triggering event to initiate its data updating process. For instance, the form 202 includes a submit button that, when selected by the user 10, causes the updater 240 to update the form data 206 from the form data source 210 with the user data 12. In other instances, the form 202 may be configured such that a particular action by the user 10, such as a particular data entry, set of data entries, or some other user input initiates the updater 240 to perform its data updating process. That is, the form builder 220 may have tied an event to the particular portion of the form 202 such that, when that event occurs, user data 12 collected by the form 202 is sent to the updater 240 to update the form data 206 from the form data source 210. In other words, the updater 240 may transfer user data 12 to the form data source 210 at any suitable interval, such as in real-time (i.e., simultaneous to data entry by the user 10), field-by-field (i.e., after an individual field is filled with user data 12), or in its entirety after completion and submission of user data in each field of the form 202. The interval at which the updater 240 transfers user data 12 may be specific to a given form 202, or a particular field or set of fields of the form 202. The author 20 may determine at which interval the updater 240 performs its updating function.

In some examples, a runtime server 235 implements the functionality of the form translator 230 and the updater 240. The runtime server 235 may host the translation logic (i.e., the form translator 230) capable of translating the structure 222 to the hostable format 232 so that the application 124 of the host container 120 may display the user interface 122 as intended by the author 20. The runtime server 235 may also host suitable structure for querying the current form data 206, 206C and communicating the form data 206C to the application 124. In other words, the runtime server 235 may provide the application programming interface (API) endpoints for communicating the hostable format 232 and form data 206, 206C to the application 124 of the host container 120. Likewise, the runtime server 235, via the updater 240, may enable the translation of user data 12 entered by the user 10 at the form 202 to be stored as form data 206 within the form data source 210. Thus, the runtime server 235 may provide the API that communicates the form 202 in a hostable format 232 and form data 206 to the application 120 and that may receive and communicate user data 12 to the form data source 210. The form data source 210, therefore, may be hosted remote from the application 124 of the host container 120 and the runtime server 235 may operate as a proxy for the application 124 to read and write on the data source 210.

In some examples, when the updater 240 receives the user data 12 or when the user 10 is attempting to input user data into the form 202, the updater 240 may provide authentication or validation services for the form manager 200. For example, when the user 10 is entering user data 12 as a data entry into the form 202, the updater 240 determines whether the data entry is a valid data entry or an invalid data entry. As described previously, portions of the form 202 that receive user data 12 may have constraints that only permit certain types of data or a certain data format. In this respect, if the user 10 attempts to enter user data 12 that does not satisfy one or more constraints, the updater 240 may consider the data entry an invalid data entry. In some examples, when a data entry is invalid, the updater 240 does not update the form data 206 of the form data store 210 with the user data 12. Additionally or alternatively, the updater 240 or the built in logic of the form itself may provide the user 10 with an indication that a data entry is an invalid data entry. Furthermore, this indication may instruct the user 10 how to reconcile the invalid data entry. For example, the user 10 enters text into a field that includes a number data type constraint and the form 202 generates a message or other indication that the field is constrained to a number data type.

In some configurations, one or more data entry fields in the form 202 may require authentication. That is, the form 202 may be configured that certain fields are editable only by particular users 10 with permission to edit those fields. In other words, form elements 204 may be tied to access permission rights that may dictate which users may be able to read and/or write to a given field. For instance, in the case of the time off request/approval process, the form 202 may include both fields of the requestor and field(s) for the manager. Here, if the user 10 does not have the necessary manager credentials, the user 10 may be unable to access or write to a manager-designated field. In this sense, the form 202 has functionality that is able to determine whether the user 10 is an authenticated user permitted to access some portion of form data 206 associated with a data entry. The fields may be selectably readable and/or writable such that a user 10 who is not authorized to write in a given field may still be able to view the field or the user 10 may only be able to read the field if they are also authorized to write in the field. Thus, the form elements 204 may be dynamic dependent upon the authorization status of the user 10. The form elements 204 may also be dynamic dependent upon the form data 206 tied to the form element 204 or otherwise provided via a designation of the author 20. In other words, the form element 204 may be a data-bound field (i.e., it displays or is configured to receive and provide form data 206) that is readable or writable by the user 10 based upon a factor other than the authorization status of the user 10. For example, in the context of the time off request/approval process, the form element 204 may be a chart of or calendar showing the calendar of various employees for the requested days off of the user 10 so that the user 10 may read (but not edit) the calendar to gauge whether the requested days off are likely to be approved or denied prior to submitting the form 202. The calendar may likewise display as read-only for the manager receiving the form 202 submitted by the user 10. Thus, the displayed calendar is a data-bound field in that it provides form data 206, but is designated as only a readable form element 204 by the author 20.

FIGS. 2B-2E are examples of a various configurations of the form manager 200. The form manager 200 may include different windows and subwindows that allow, for example, the author 20 to design the form 202 to meet his or her needs based on the particular host container 120. For instance, the form manager 200 includes a menu 250 with menu options 252, 252a-n that allow the author 20 to configure the form data 206, the user experience, and/or the automation associated with a form 202. Here, the menu 250 includes menu items 252a—n that the author 20 may select to configure some portion of the form 202. In these examples, the menu items 252 correspond to information about the form manager (e.g., "info"), data sources for the form 202 (e.g., "data"), the design of the user interface (e.g., "UX"), the behavior or configurable automation that may be configured for the form 202 (e.g., "behavior" and "automation"), security such as authentication or access permissions that may be associated with the form 202 or who may author forms 202 for particular sensitive data (e.g., "security") among others. Each of these menu items 252, when selected, can further include one or more windows 260, 260a—n that correspond to further configurable functionality of the selected menu item 252.

Figure 2A:
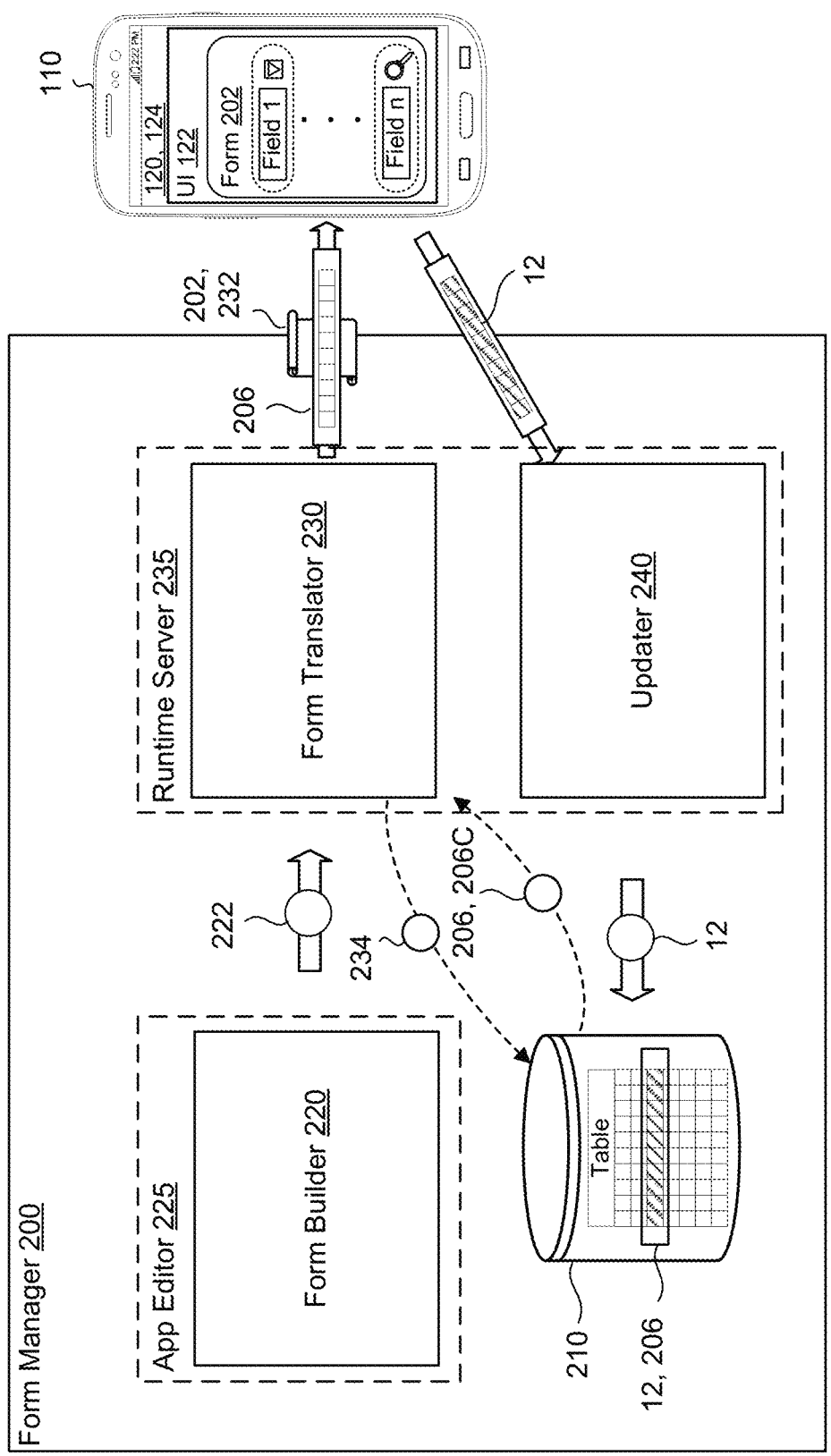
Figure 2B:
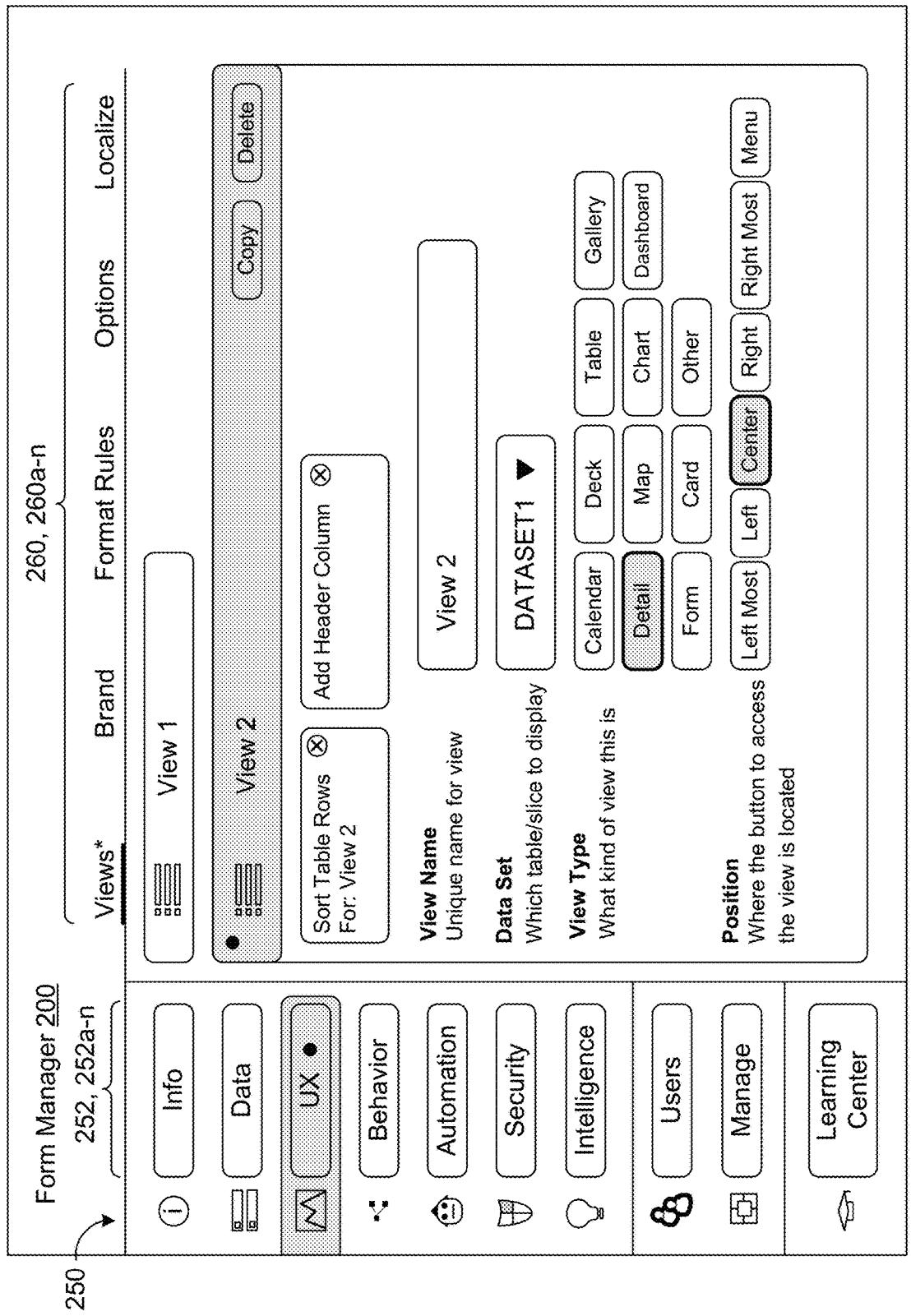
Figure 2C:
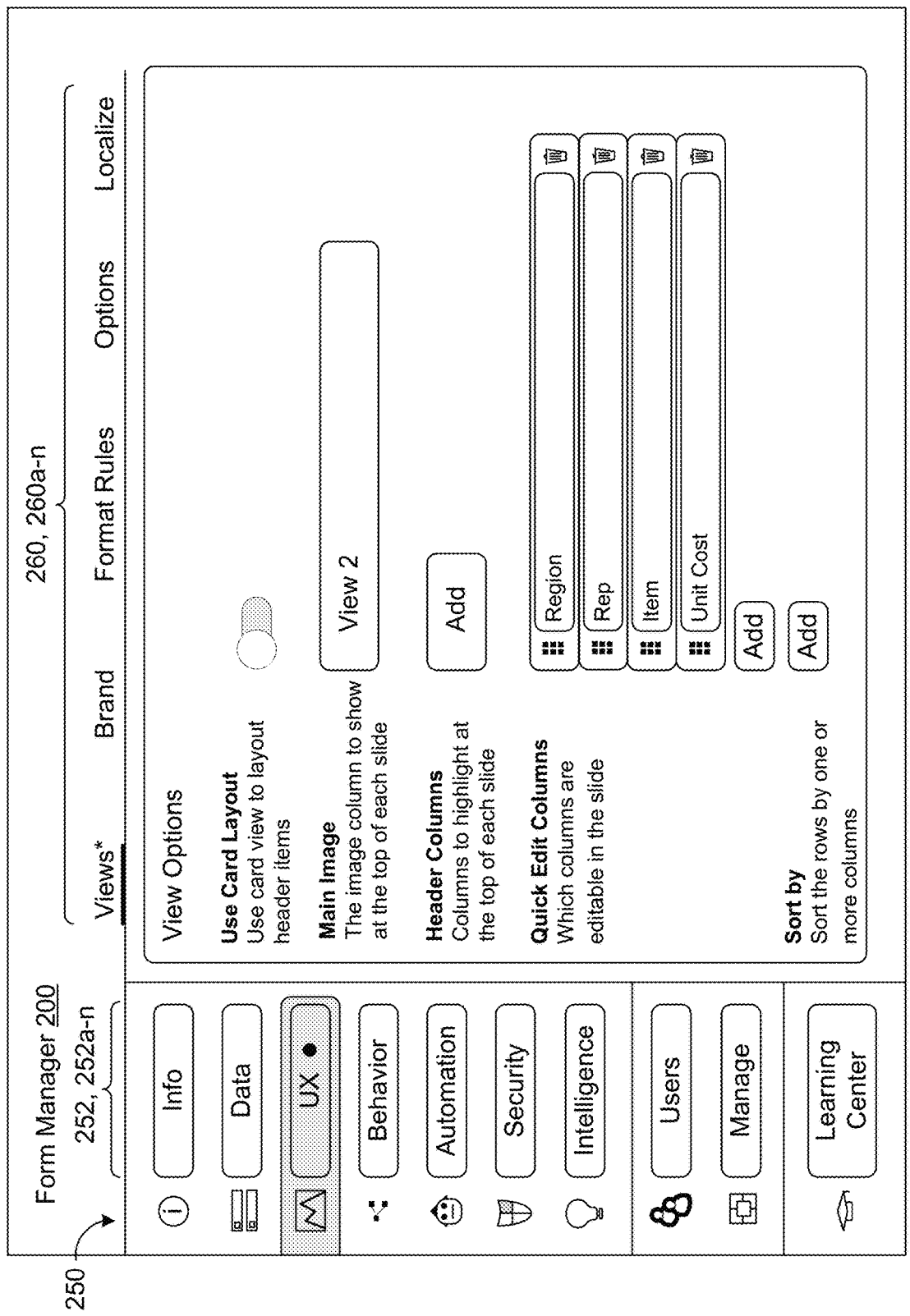

In FIGS. 2B and 2C, the author 20 has selected the menu item 252 corresponding to the user experience ("UX") to design the look and feel of the form 202. Here, the author 20 may design one or more views that may be incorporated into the form 202 along with other design-based features for the particular view such as style, format, typeface, etc. When designing a view, the author 20 may dictate the form data 206 that may be incorporated into the view as well as the type of view. The author 20 may also be able to design how the data should be labeled or titled in a view. Moreover, as shown in FIG. 2C, the author 20 can design how the form data 206 will be presented in the view. For instance, FIG. 2C illustrates that the fields associated with the view have been configured to be region data, representative data (e.g., who the sales representative is), item data, and unit cost data. As illustrated by FIG. 2C, the author 20 may add or remove data fields associated with a view and additionally provide any custom data or field sorting that the author 20 desires.

Figure 2D:
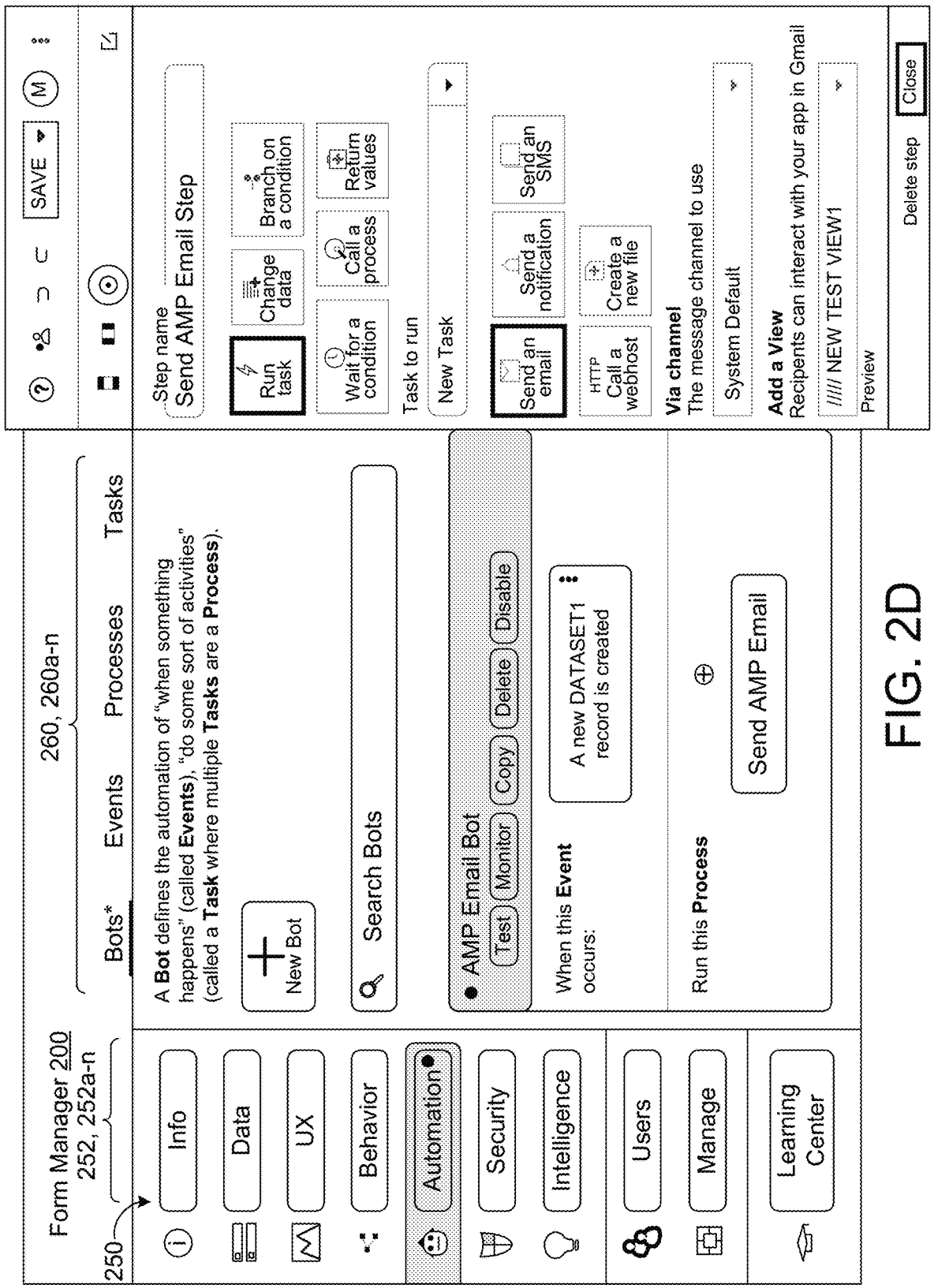
Figure 2E:
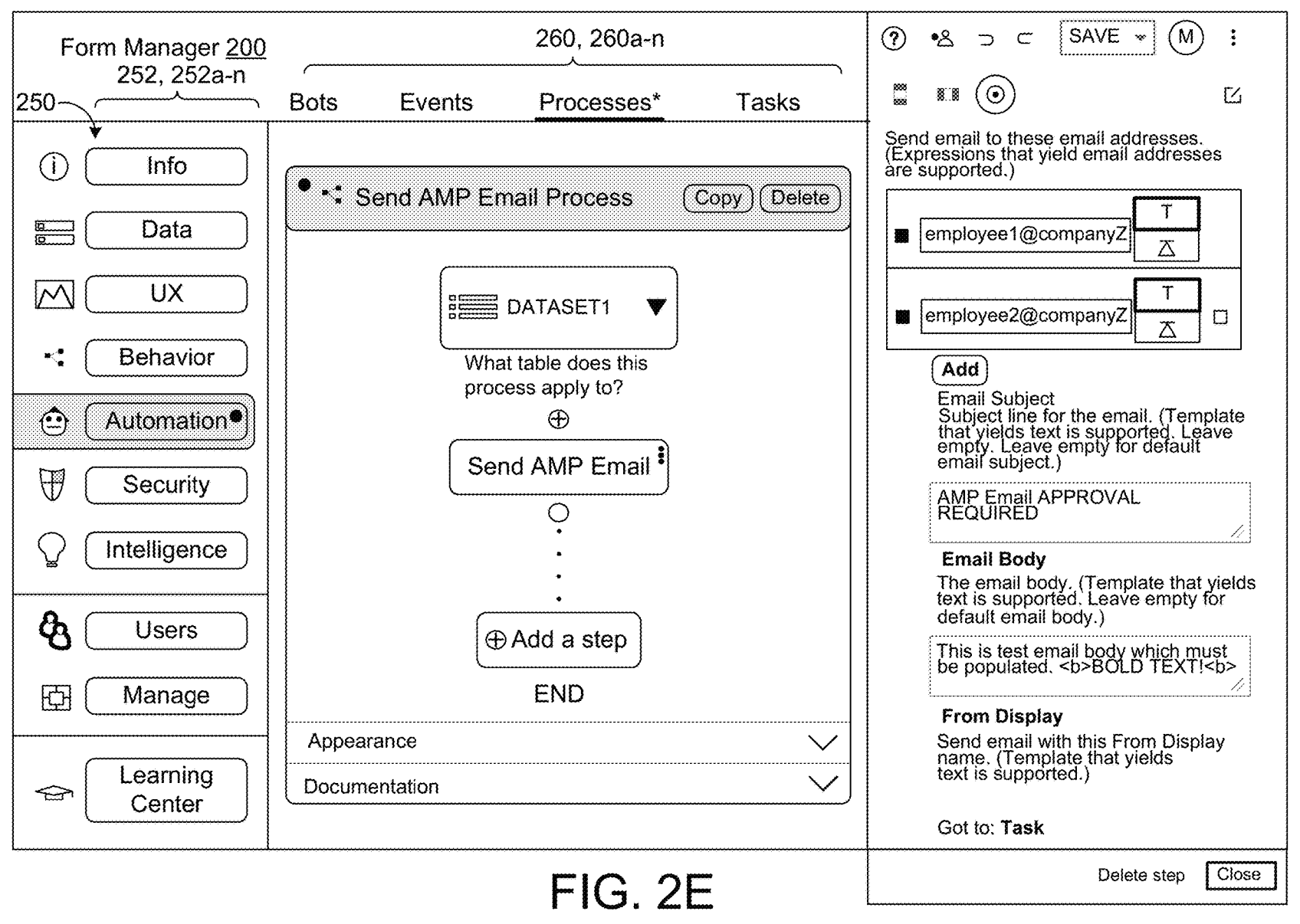

Referring to FIGS. 2D and 2E, the author 20 has selected the menu item 252 from the menu 250 corresponding to automation. Here, the automation portion of the form manager 200 enables the author 20 to generate bots that define a particular automation function. A bot may be configured to define when something happens (i.e., an automation event) and what activity occurs in response to the automation event. That is, what task or set of tasks should occur in response to an automation event or triggering event built into the form 202. In the automation menu item 252, the author 20 may toggle between windows 260, 260a-n that include: "bots," to generate a bot; "events" to setup an event; "processes" to configure multiple tasks (i.e., a set or series of tasks) to occur for a bot; or "tasks" to configure a single task. In the example shown in FIG. 2D, the author 20 is configuring an AMP email bot that generates an email (i.e., the designated process) when a new record is created using the form 202 (i.e., the designated event). The rightmost column also depicts the different actions that may be configured to occur for a task or process (e.g., run the task, change the data, branch to a condition, wait for a condition, call a process, or return some type of values). Furthermore, as shown by the selection of "run task," the different categories of actions may then be more precisely configured with more detailed actions, such as "send an email" being the "run task." Each of these detailed actions may be precoded or programmed such that the author 20, for example, only needs to assign tasks to particular data in order to create automation within a form 202. In FIG. 2E, the author 20 is designing a process (i.e., a set of tasks) to occur for the form 202. When designing a process, the author 20 may be able to compound tasks for more sophisticated automation. For instance, the process illustrated in FIG. 2E is being designed to be a multi-party form 202 that interacts with two different email recipients. Furthermore, the process designates particulars about the email being automatically generated such as the email subject, the email body, and how the form 202 may be displayed in the email itself.

Figure 3A:

FIGS. 3A and 3B are examples of two different forms 202 that may be generated by the author 20 using the form manager 200. FIG. 3A illustrates a form 202 in a form view while FIG. 3B depicts a form 202 in a detailed view. The user 10, when generating a form 202 may be able to choose between a form view and a detail view for a form 202. When the user 10 selects a form view, the form manager 200 generates a form that converts all of the supported columns from the form data source 210 into inputs that are rendered into the host container 120 (e.g., an email of an email application). Furthermore, in addition to the inputs, the form view of a form 202 may also include a "save" button. Here, when the user 10 selects the save button, data entered by the user 10 (i.e., user data 12) may be updated in the form data source 210 (e.g., by the updater 240). Referring specifically to FIG. 3A, the form 202 is a requestor form that identifies a purchase request. Here, the requestor form 202 includes four field elements 204a—d that designate the requestor, the date of the request, the justification for the request, and an action element (i.e., the submit button). In this example, the submit button functions similar to a save button where, when selected, data entered into the form 202 is added or updated in the form data source 210. In contrast, FIG. 3B is an approval form 202 that corresponds to the requestor form 202 of FIG. 3A. That is, the approval form 202 includes details of the user data 12 that were entered into the requestor form 202 in addition to other field elements 204. Here, the fields 204 such as the requestor and the request data are populated from the requestor form while the other field elements 204c—h, such as the rejected reasons, the approval notes, the decision, and the action, may be entered by another user, such as a manager with approval authorization.

Figure 4:
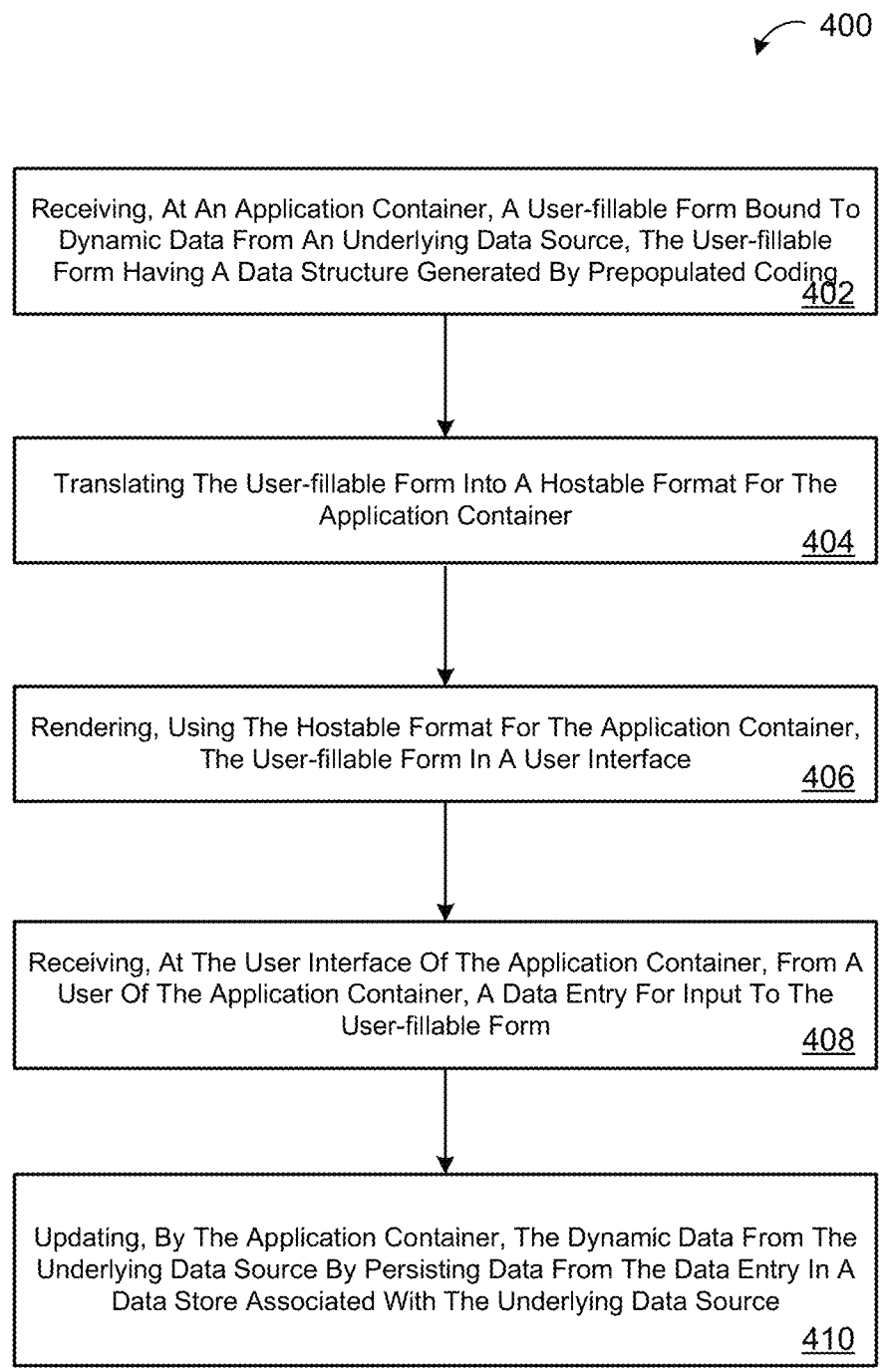
FIG. 4 is a flow chart of an example arrangement of operations for a method of using an editable form for a host container.

FIG. 4 is a flowchart of an example arrangement of operations for a method 400 for using a user-fillable form 202 in a host container 120. At operation 402, the method 400 receives, at a host container 120, a user-fillable form 202 bound to dynamic data 206 from an underlying data source 210 where the user-fillable form 202 has a data structure 222 generated by prepopulated coding. At operation 404, the method 400 translates the user-Tillable form 202 into a hostable format 232 for the host container 120. At operations 406, the method 400 renders, using the hostable format 232 for the host container 120, the user-fillable form 202 in a user interface 122. At operation 408, the method 400 receives, at the user interface 122 of the host container 120, from a user 10 of the host container 120, a data entry 12 for input to the user-fillable form 202. At operation 410, the method 400 updates, by the host container 120, the dynamic data 206 from the underlying data source 210 by persisting data 12 from the data entry in a data store associated with the underlying data source 210.

Figure 5:
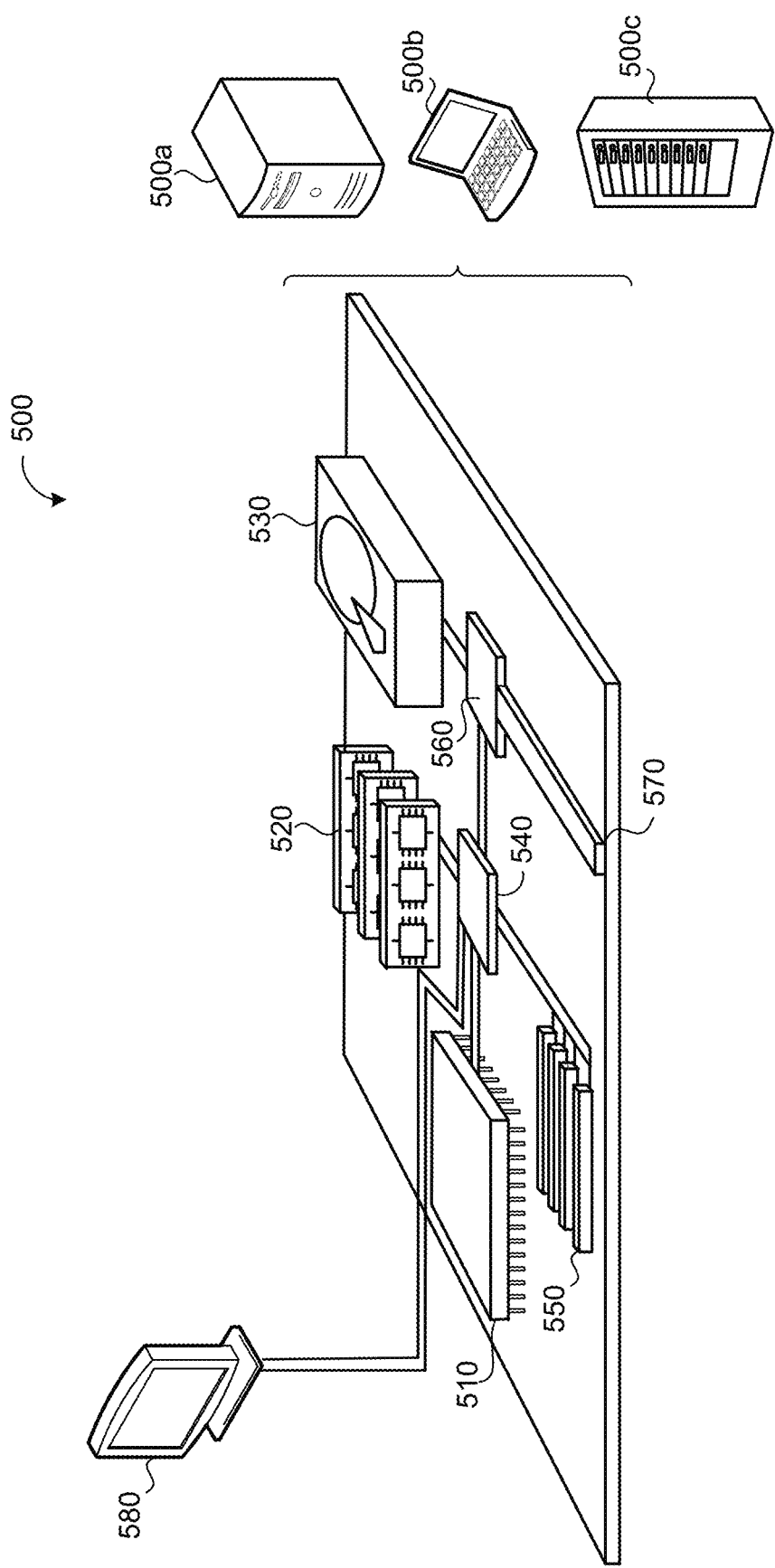
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:

receiving, at a first host container, a message generated in response to creation of a record within a dataset of an underlying data source stored at a data store associated with the underlying data source, the message comprising a first user-fillable form bound to dynamic data from the dataset of the underlying data source, the first user-fillable form having a first data structure generated by first prepopulated coding, the first prepopulated coding authored by an author using a no code environment;

translating the first user-fillable form into a hostable format for the first host container;

rendering, using the hostable format for the first host container, the first user-fillable form in a user interface;

receiving, at the user interface of the first host container, from a user of the first host container, a first data entry for input to the first user-fillable form, the user different from the author;

updating, by the first host container, the dynamic data from the dataset of the underlying data source by persisting data from the first data entry at the data store associated with the underlying data source, wherein persisting the data from the first data entry comprises adding a row to a table associated with the record;

in response to updating the dynamic data from the dataset of the underlying data source, receiving, at a second host container, a second message comprising a second user-fillable form bound to the dynamic data from the dataset of the underlying data source, the second user-fillable form having a second data structure generated by second prepopulated coding, the second user-fillable form different from the first user-fillable form, the second host container different than the first host container;

receiving a second data entry for input to the second user-fillable form; and updating, by the second host container, the dynamic data from the dataset of the underlying data source by persisting data from the second data entry at the data store associated with the underlying data source, wherein persisting the data from the second data entry comprises modifying the row added to the table associated with the record.

2. The method of claim 1, wherein the operations further comprise:

requesting, by the first host container, an application associated with the underlying data source to generate the first user-fillable form, wherein receiving the first user-fillable form comprises receiving the first user-fillable form generated by the application associated with the underlying data source.

3. The method of claim 1, wherein rendering the first user-fillable form in the user interface comprises rendering the first user-fillable form in the user interface in response to an indication of a user action performed in the first host container, the user action indicating that the user intends to communicate with the underlying data source.

4. The method of claim 1, wherein the operations further comprise:

querying the underlying data source for the dynamic data;

receiving query results comprising current data corresponding to the dynamic data from the underlying data source; and populating the current data in the first user-fillable form, wherein the first user-fillable form rendered in the user interface comprises the current data.

5. The method of claim 1, wherein the operations further comprise:
   determining whether the first data entry received from the user for input to the first user-fillable form comprises a valid data entry,
   wherein updating the dynamic data from the underlying data source by persisting the data from the first data entry in the data store associated with the underlying data source occurs when the first data entry received from the user for input to the first user-fillable form comprises the valid data entry.

6. The method of claim 5, wherein the operations further comprise, when the first data entry received from the user for input to the first user-fillable form comprises an invalid data entry:
   generating an indication that the first data entry is invalid; and
   receiving a valid form of the first data entry,
   wherein updating the dynamic data from the underlying data source comprises using the valid form of the first data entry to update the dynamic data from the underlying data source.

7. The method of claim 1, wherein the operations further comprise determining that the user is an authenticated user permitted to access a portion of the dynamic data associated with the first data entry.

8. The method of claim 1, wherein the first user-fillable form comprises a read-only field and an editable field capable of receiving user-generated data.

9. The method of claim 1, wherein the underlying data source is hosted by an application residing outside of the first host container.

10. The method of claim 1, wherein updating the dynamic data from the underlying data source occurs as the user interface receives the first data entry for input to the first user-fillable form from the user.

11. The method of claim 1, wherein the first host container executes an electronic mail (email) communication application.

12. The method of claim 11, wherein the user interface rendering the first user-fillable form comprises a body of an email message.

13. The method of claim 12, wherein updating the dynamic data from the underlying data source occurs responsive to a trigger associated with the first data entry input to the first user-fillable form rendered in the body of the email message.

14. The method of claim 13, wherein the trigger associated with the first data entry input comprises at least one of (i) the first data entry input to the first user-fillable form of a specified one of a plurality of fields of dynamic data; (ii) the first data entry input to the first user-fillable form of a specified group from the plurality of fields of dynamic data; or (iii) a user-selectable action element of the first user-fillable form, the action element indicating completion of the first data entry input.

15. A system comprising:
   data processing hardware; and
   memory hardware in communication with the data processing hardware, the memory hardware storing instructions that when executed on the data processing hardware cause the data processing hardware to perform operations comprising:
      receiving, at a first host container, a message generated in response to creation of a record within a dataset of an underlying data source stored at a data store associated with the underlying data source, the message comprising a first user-fillable form bound to dynamic data from the dataset of the underlying data source, the first user-fillable form having a first data structure generated by first prepopulated coding, the first prepopulated coding authored by an author using a no code environment;
      translating the first user-fillable form into a hostable format for the first host container;
      rendering, using the hostable format for the first host container, the first user-fillable form in a user interface;
      receiving, at the user interface of the first host container, from a user of the first host container, a first data entry for input to the first user-fillable form, the user different from the author;
      updating, by the first host container, the dynamic data from the dataset of the underlying data source by persisting data from the first data entry at the data store associated with the underlying data source, wherein persisting the data from the first data entry comprises adding a row to a table associated with the record;
      in response to updating the dynamic data from the dataset of the underlying data source, receiving, at a second host container, a second message comprising a second user-fillable form bound to the dynamic data from the dataset of the underlying data source, the second user-fillable form having a second data structure generated by second prepopulated coding, the second user-fillable form different from the first user-fillable form, the second host container different than the first host container;
      receiving a second data entry for input to the second user-fillable form; and
      updating, by the second host container, the dynamic data from the dataset of the underlying data source by persisting data from the second data entry at the data store associated with the underlying data source, wherein persisting the data from the second data entry comprises modifying the row added to the table associated with the record.

16. The system of claim 15, wherein the operations further comprise:
   requesting, by the first host container, an application associated with the underlying data source to generate the first user-fillable form,
   wherein receiving the first user-fillable form comprises receiving the first user-fillable form generated by the application associated with the underlying data source.

17. The system of claim 15, wherein rendering the first user-fillable form in the user interface comprises rendering the first user-fillable form in the user interface in response to an indication of a user action performed in the first host container, the user action indicating that the user intends to communicate with the underlying data source.

18. The system of claim 15, wherein the operations further comprise:
   querying the underlying data source for the dynamic data;
   receiving query results comprising current data corresponding to the dynamic data from the underlying data source; and
   populating the current data in the first user-fillable form, wherein the first user-fillable form rendered in the user interface comprises the current data.

19. The system of claim 15, wherein the operations further comprise:

determining whether the first data entry received from the user for input to the first user-fillable form comprises a valid data entry,
wherein updating the dynamic data from the underlying data source by persisting the data from the first data entry in the data store associated with the underlying data source occurs when the first data entry received from the user for input to the first user-fillable form comprises the valid data entry.

20. The system of claim 19, wherein the operations further comprise, when the first data entry received from the user for input to the first user-fillable form comprises an invalid data entry:
generating an indication that the first data entry is invalid; and
receiving a valid form of the first data entry,
wherein updating the dynamic data from the underlying data source comprises using the valid form of the first data entry to update the dynamic data from the underlying data source.

21. The system of claim 15, wherein the operations further comprise determining that the user is an authenticated user permitted to access a portion of the dynamic data associated with the first data entry.

22. The system of claim 15, wherein the first user-fillable form comprises a read-only field and an editable field capable of receiving user-generated data.

23. The system of claim 15, wherein the underlying data source is hosted by an application residing outside of the first host container.

24. The system of claim 15, wherein updating the dynamic data from the underlying data source occurs as the user interface receives the first data entry for input to the first user-fillable form from the user.

25. The system of claim 15, wherein the first host container executes an electronic mail (email) communication application.

26. The system of claim 25, wherein the user interface rendering the first user-fillable form comprises a body of an email message.

27. The system of claim 26, wherein updating the dynamic data from the underlying data source occurs responsive to a trigger associated with the first data entry input to the first user-fillable form rendered in the body of the email message.

28. The system of claim 27, wherein the trigger associated with the first data entry input comprises at least one of (i) the first data entry input to the first user-fillable form of a specified one of a plurality of fields of dynamic data; (ii) the first data entry input to the first user-fillable form of a specified group from the plurality of fields of dynamic data; or (iii) a user-selectable action element of the first user-fillable form, the action element indicating completion of the first data entry input.

* * * * *